United States Patent [19]
McCann et al.

[11] 3,900,858
[45] Aug. 19, 1975

[54] CAMERA TO MICROSCOPE ADAPTOR WITH A SPECIAL OPTICAL ELEMENT

[75] Inventors: Mary Conlin McCann, Belmont; William T. Plummer; Vivian K. Walworth, both of Concord, all of Mass.

[73] Assignee: Polaroid Corporation, Cambridge, Mass.

[22] Filed: Dec. 3, 1973

[21] Appl. No.: 420,913

[52] U.S. Cl. .................. 354/79; 240/1 LP; 350/19; 350/96 R
[51] Int. Cl. .......................................... G03b 17/48
[58] Field of Search ................... 354/79, 293, 295; 240/1 LP, 1 EL; 350/18, 19, 36, 96 R; 355/18, 68

[56] References Cited
UNITED STATES PATENTS

| | | | |
|---|---|---|---|
| 3,106,129 | 10/1963 | Frenk et al. | 354/79 |
| 3,292,490 | 12/1966 | Moore | 354/79 |
| 3,308,709 | 3/1967 | Harrick | 350/96 R |
| 3,330,190 | 7/1967 | Taillie | 240/1 LP |
| 3,548,730 | 12/1970 | Verge | 350/19 |
| 3,623,807 | 11/1971 | Gabler et al. | 350/19 |
| 3,721,170 | 3/1973 | Johnson | 354/79 |
| 3,798,665 | 3/1974 | Eloranta et al. | 354/79 |

*Primary Examiner*—Richard L. Moses
*Attorney, Agent, or Firm*—Frederick H. Brustman; John W. Ericson

[57] ABSTRACT

The invention is an optical element, one version of which is useful for operating an automatic exposure control of a self-contained camera coupled to a microscope without detracting from the brightness of the magnified image to be recorded on the camera's film format. The article includes three reflecting surfaces arranged to extract a small part of the light emerging from the microscope's eyepiece and direct it into the photodetector of the automatic exposure control. A lens refracts the light, after the third reflection, to improve the distribution of the light onto the camera's photodetector. The article is suitable for manufacture as a homogeneous molding of transparent plastic.

7 Claims, 5 Drawing Figures

CAMERA TO MICROSCOPE ADAPTOR WITH A SPECIAL OPTICAL ELEMENT

BACKGROUND OF THE INVENTION

The invention described herein is particularly useful in an adaptor for attaching a self-contained camera, with an automatic exposure control, to an image-forming optical system such as a microscope. An important consideration in adapting such a camera for photography through a microscope of other instrument is to preserve the automatic exposure control feature without reducing the amount of light available for the photographic exposure of a film unit within the camera.

Prior art arrangements for coupling self-contained cameras with automatically controlled exposure systems to optical instruments propose the diversion of some part of the useful light, light intended for the photographic image, onto the photosensitive detector in the automatic exposure control of the camera. Typically, this diversion is accomplished by a beam splitter or similar optical element within the instrument.

U.S. Pat. Nos. 3,130,634 and 3,292,490 exemplify the foregoing scheme. The former shows a conventional arrangement with a beam splitter inside the phototube to deflect a large fraction of light to an exposure control system. As with other conventional systems, the diversion markedly reduces the available light at the film plane. The latter patent shows a camera attached to make a photograph through one eyepiece of a binocular microscope and a fiber optic light pipe connecting the other eyepiece of the binocular microscope to the photodetector of the camera's automatic exposure control. The optical arrangement of such a microscope uses an internal beam splitter to divert half of the available light to each eyepiece. It makes light available to actuate the automatic exposure control attached to one eyepiece, but only at the expense of the photograph made through the other eyepiece. This intentional reduction in the illumination of the image, merely to actuate the automatic exposure control, can have a critical and deleterious effect on a photograph made through an image-forming optical instrument because the amount of light available is generally quite limited.

The prior art also includes a photographic microscope system such as the Zeiss ULTRAPHOT II. The photographic portion of the system is integrated with the microscope objective optics to form a special camera. The camera is neither self-contained nor functional apart from its place in the system. It has a photodetector at the focal plane and outside the boundary of a mask defining its photographic format. The illumination intensity at the focal plane is the least of any location along the optical path. Thus, the focal plane is an inefficient place to locate the detector for an exposure control. Moreover, at the focal plane a detector is most likely to give a spurious indication of the required exposure due to an anomaly in the magnified image.

OBJECTS AND SUMMARY OF THE INVENTION

An object of the present invention is an integral optical element to extract light from the optical path between an image-forming optical instrument and a self-contained camera coupled to the instrument for operating the automatic exposure control of the camera without affecting the recorded image.

Another object of the present invention is a prismatic optical element to divert from the optical path, between an image-forming instrument and a camera coupled to the instrument, at least a portion of the light constituting that part of the image formed by said instrument that would otherwise lie outside the film format boundary of the camera for the purpose determining the proper exposure for recording the image.

The invention described in co-pending U.S. patent application Ser. No. 420,915, filed on Dec. 3, 1973 by Vivian K. Walworth for CAMERA TO MICROSCOPE ADAPTOR WITH MEANS FOR OPERATING AN EXPOSURE CONTROL and assigned to the assignee of this application recognizes and capitalizes on the fact that image-forming optical instruments have circular fields, since they are made from spherical optical elements, but that photographic films are made with rectilinear formats. For aesthetic and technical reasons, the circular image formed by an optical instrument is enlarged to fill the corners of the film's rectilinear format. Thus, the chordal segments of the circular image lying outside the rectilinear format are surplusage. However, the illumination of the surplus chordal segments is indicative of the central image's illumination, and the light forming them can be used for other purposes without detracting from the recorded image's illumination, quality or content.

The present invention includes a monolithic prismatic optical element that extracts at least a portion of the light forming at least one of the surplus chordal segments from the optical path between the instrument and a self-contained camera coupled to the instrument. A monolithic element is optically more efficient and simpler to manufacture than the arrangement shown in co-pending application, Ser. No. 420,915. It is particularly useful when used with an adaptor such as described in the aforementioned co-pending application, Ser. No. 420,915. The monolithic prismatic optical element, which fits between the camera and the instrument, directs the light onto a photocell so as to activate the automatic exposure control of the self-contained camera. The light can be directed to an independent exposure meter instead.

The optical element includes at least two reflecting surfaces molded as an integral part of it. The first extends into the optical path between the camera's objective lens and the instrument's eyepiece. It extends into the optical path far enough to intercept and laterally reflect a segment of the circular beam of light coursing along the optical path from the instrument to the camera but not so far between them that it casts a shadow inside the boundaries of the camera's film format. The second reflecting surface is opposite the photodetector of the self-contained camera's automatic exposure control. It is oriented to reflect into the photodetector the light extracted by the first reflecting surface from the optical path. A small condensing lens located in the path of the extracted light, proximate the entrance to the camera's photodetector, optimizes the photometric effect of the extracted light. An intermediate reflecting surface can be molded into the article to accommodate for displacement of the photodetector in two coordinate directions.

A special advantage of the present invention is the formation of the foregoing optical arrangement so it is suitable for molding in a single piece as an integral optical element from an optically clear plastic material. The single piece will easily fit in a narrow separation between the camera and the instrument.

DESCRIPTION OF THE DRAWINGS

Other objects and many of the attendant advantages of the present inventions will be better appreciated and the inventions will become more clearly understood by reference to the following detailed description when considered in conjunction with the accompanying drawings illustrating the instant inventions, wherein.

THE PREFERRED EMBODIMENT OF THE INVENTION

Figure 2:
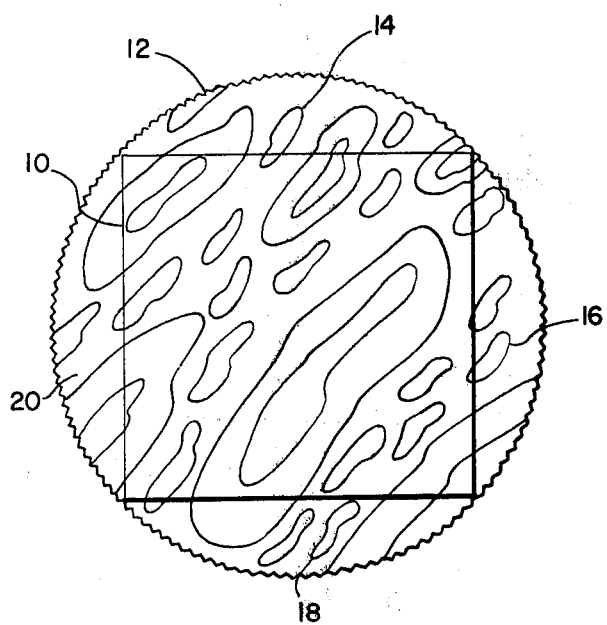
FIG. 2 illustrates how filling a rectilinear film format with a circular image results in four unused chordal image segments.

The concepts of this invention are best understood by reference to FIG. 2. FIG. 2 represents a microscope image of a hypothetical biological specimen superimposed on a square photosensitive film unit. A square boundary 10 represents the rectilinear format boundary of a commercial photographic film unit suitable for use in a self-contained camera attached to an image-forming optical instrument. For aesthetic as well as other considerations, the instrument and the camera are matched so the instrument's image will fill the corners of the rectilinear film format. However, the typical image-forming optical instrument, e.g., a microscope, has a circular image field 12. The circuitry results from the rotationally symmetric nature of most optical elements. To fill the rectilinear film format 10, the circular image field 12 must have a diameter at least equal to a diagonal of the rectilinear format 10. This results in four chordal segments 14, 16, 18 and 20 of the instrument's image that fall outside the boundaries of the film format 10. Previously, in instrument cameras, they gone good unused and provisions have been made to absorb the light destined for those chordal segments 14, 16, 18 and 20.

The present invention recognizes that the brightness of the image in the chordal segments 14, 16, 18 and 20 is indicative, in most cases, of the image's brightness within the rectilinear film format 10's area. Therefore, light from the image-forming optical instrument destined to form one or more of the chordal segments 14, 16, 18 and 20 can be usefully diverted to the light sensor of the automatic exposure control of a camera containing the film unit 10 without stealing light from the useful (recorded) image area within the film format boundary 10 and without superimposing a light sensing probe on the useful image.

Figure 1:
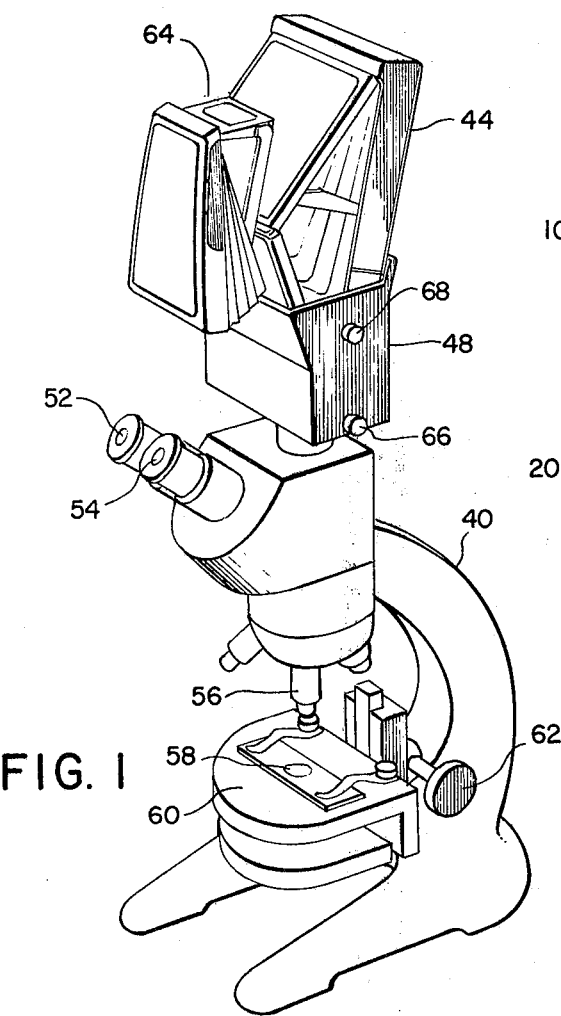
FIG. 1 illustrates a self-contained photographic camera attached by a holder to an optical instrument.

FIG. 1 illustrates a microscope 40 fitted with a novel fully automatic and self-containedd SX-70 Land Camera 44 sold by the Polaroid Corporation. The figure illustrates a holder 48 for attaching such a camera to the photocube of a microscope. The SX-70 Land Camera 44 has an automatic exposure control utilizing a photodetector that looks in the same direction as the objective lens but is laterally displaced in the shutter housing from it. An accessory article for diverting light intended for the chordal sectors of the image formed by the microscope 40 is described below.

Though these and other figures show the inventions used with an SX-70 Land Camera the reader will understand that the inventions can be used with any camera having an automatic exposure control with its photocell offset from the camera's optic axis. e.g., Colorpack II and Model 300 Series Land Cameras. Moreover, this invention can also be used to direct light to a photocell on a camera not having automatic exposure control, but with an integral light meter instead, or to feed light to an independent light meter.

The microscope 40 shown in FIG. 1 is a conventional binocular type with a third, vertical tube for photographic use. Within the microscope 40 is a means (not shown) such as a movable mirror or prism that, in one position, directs the image to the eyepieces 52 and 54 or, in another position, allows the image to enter the vertical tube.

The following procedure explains a method for using a SX-70 Land Camera on a microscope. An eyepiece, not shown, is inserted in the vertical phototube of the microscope 40. The eyepiece in combination with the microscope 42's objective 56 forms a magnified virtual image of the subject 58 stationed on the microscope stage 60. Microscope optics are conventionally desinged to form the magnified virtual image at an apparent distance of about 50 centimeters or so below the eyepiece. That distance is well within the close-up focusing capability of the SX-70 Land Camera 44.

The SX-70 Land Camera 44 positioned by the holder 48 over the vertical phototube receives the virtual image of the subject 58 emerging from the eyepiece. Its objective lens forms a real image of the subject 58 on its focal plane. The most convenient means for focusing the real image on its focal plane is the focusing knob 62 of the mimcroscope 40. Turning the knob 62 will adjust the focus of the real image at the focal plane. The microscopist can observe the image through the viewer 64 of the camera 44 while he turns the knob 62 to focus it. Good photographic results are achieved by setting the SX-70 Land Camera for focus at a distance of about 1 meter, the focal distance for which its objective lens performs best, and using the knob 62 to focus the image on the camera's focusing screen.

Experiments indicate that many microscope eyepieces magnify the microscope objective 56's image enough to fill the corners of the film format with the camera's objective focused at about 1 meter. In some instances the eyepiece regularly supplied with the microscope will not magnify the image enough to completely fill the corners of a camera's film format, this situation can be corrected to some extent by adjusting the camera's objective to focus closer than 1 meter. It is preferable though to use a wide angle eyepiece in the vertical phototube. Wide angle eyepieces are available. Ideally, the field of view subtended by the optics of the camera and the microscope will slightly overfill the film format area so their alignment is not important to filling the corners of the film format. Those skilled in the art will now understand that the foregoing procedure and the holders will also work quite well with a plain monocular microscope and the following explanation is applicable to such an arrangement too.

In the foregoing arrangement for coupling the SX-70 Land Camera 44 to the microscope 40, a place to extract some light from the optical path is the small space separating the camera's objective lens from the microscope's eyepiece. An integral molded optical element for doing so is described below.

The holder 48 has two knobs 66 and 68. The lowe knob 66 controls a clamp (not shown) that locks the holder onto the vertical phototube of the microscope 40. The upper knob 68 adjusts the position of the molded optical element (not shown in FIG. 1) that diverts the light from a chordal segment to the automatic exposure control of the camera 44. This position adjustment is a feature to maximize the transfer of chordal segment light into the automatic exposure control, but it is not necessary for the proper operation of the invention. It can also adjust the automatic exposure control's function by varying the amount of chordal segment light reaching the photodetector through the molded optical element. In this way it can supplement the function of the camera 44's trim control.

Figure 3A:
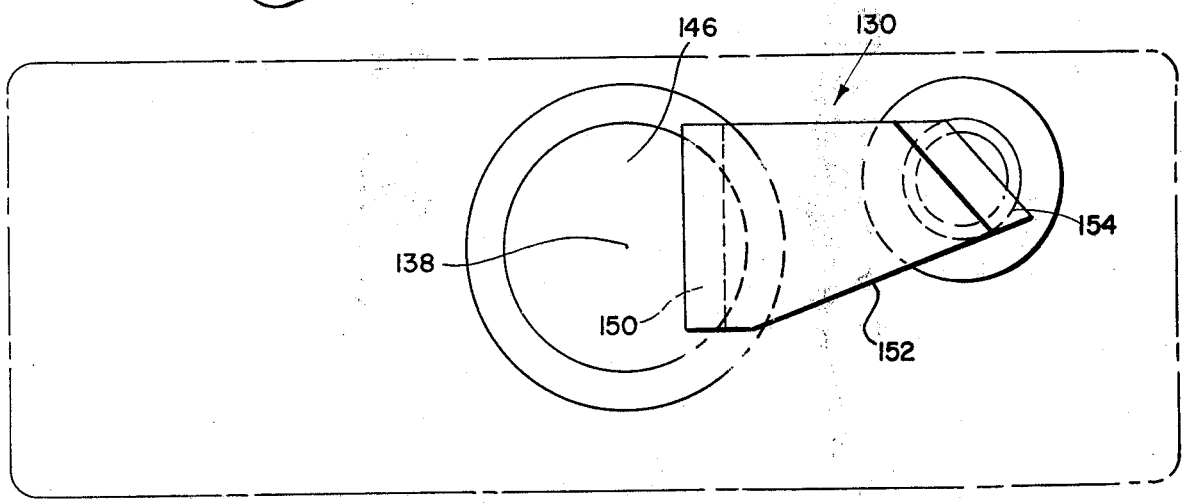
FIGS. 3a, 3b and 3c illustrate an integral optical element to extract light from the optical path between a self-contained camera and an image-forming optical instrument.
Figure 3B:
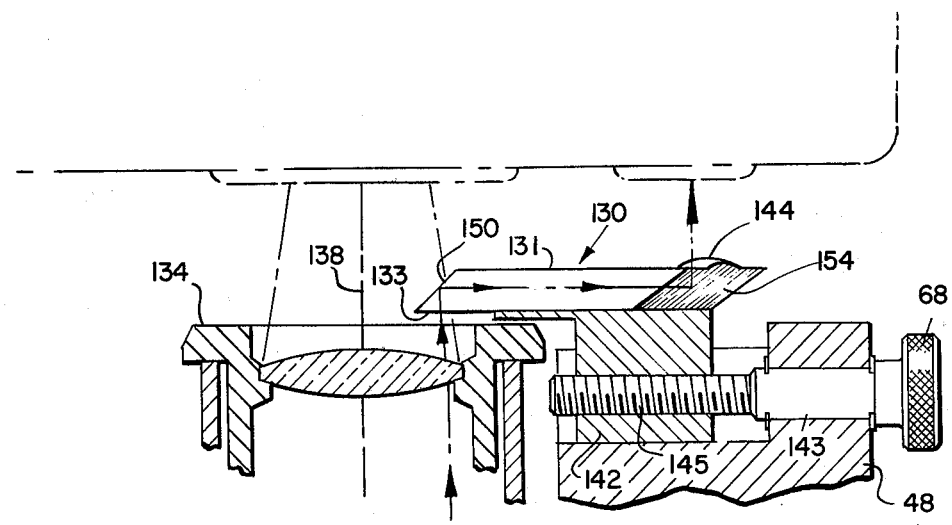
Figure 3C:
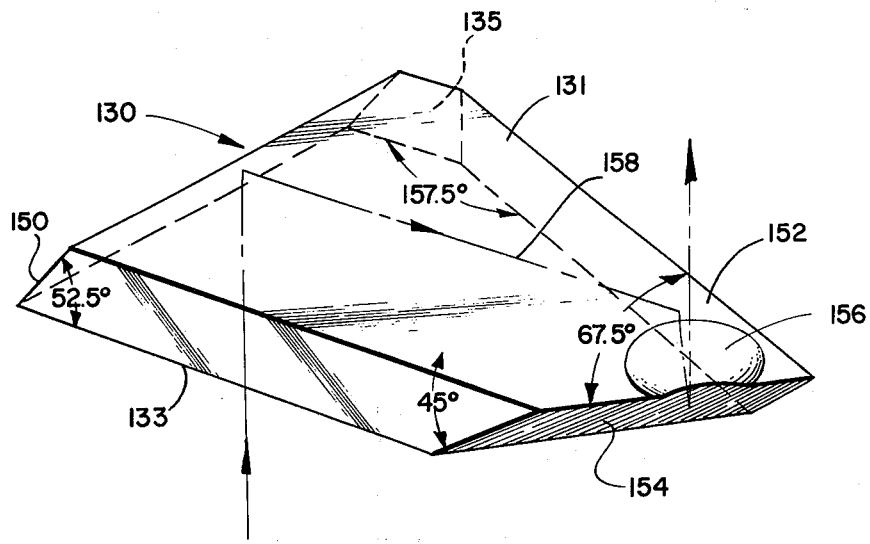

Reference to FIGS. 3a, 3b and 3c is useful in understanding this invention. It shows an integral optical element 130 that directs light for an otherwise unused portion of a microscope image into the automatic exposure control of a camera. The integral optical element 130 (shown enlarged in the isometric view of FIG. 3c) fits in the separation between the shutter housing 132 of an SX-70 Land Reflex Camera and the eyepiece 134 of a microscope (see FIG. 3b). The eyepiece 134 fits in the vertical phototube 136 of a microscope. The holder 48 positions the SX-70 Camera so its objective lens (not shown in FIG. 3b) is coaxial with the eyepiece 134 along the optic axis 138. Only a portion of the holder 48 is shown in FIG. 3b.

The prismatic integral optical element 130 is positioned by a support 142 that slides axially with shaft 143 but will not rotate. Rotating the knob 68 attached to the threaded shaft 143 causes the support 142 to move axially on the screw thread 145. The shaft will rotate but is restricted from axial movement. Other means of positioning the prismatic integral optical element 130 will occur to users of the concepts disclosed herein.

The optical element 130 comprises two smooth parallel surfaces 131 and 133 with a first mirror 150 that reflects light entering through one of the smooth surfaces lengthwise between them. Total internal reflection causes the optical element 130 to act as a "light pipe" conveying the trapped light to an intermediate reflecting surface 152 which reflects it to another reflecting surface 154 that reflects the light through a lens 156 on the second smooth surface.

The entrance window 144 to the photodetector of the self-contained camera's automatic exposure control is displaced in two coordinates from the optic axis 138 of the objective lens 146. FIG. 3a shows the relationship best. It also shows the monolithic optical element 130 in place where its first reflecting surface 150 reflects light entering the optical element through its bottom surface toward the longitudinal edge 152. The optical element 130 is preferably positioned so any shadow cast by the edge of its reflecting surface 150 at the film plane is parallel to an edge of the camera's film format.

Total internal reflection of light incident on edge 152 conducts it toward the reflecting surface 154. The reflecting surface 154 reflects the light upward into the window 144 of the automatic exposure control. The lens 156, formed as an integral part of the prismatic optical element 130, promotes the effective transfer of light between the element 130 and the automatic exposure control. It is not essential to the successful functioning of the invention.

The path of light through the element 130 is better understood by reference to FIG. 3c in which the ray 158 (with directional arrowheads) represents the general path of light through the element 130. The bundle of light rays intercepted by the element 130 at the end proximate the reflecting surface 150 is converging toward the exit pupil of the microscope eyepiece 134. The bundle of rays continues to converge inside the element 130 as it proceeds toward the lens 156 and achieves its minimum size in the vicinity of the edge 152. It then diverges. The lens 156 has a focal length approximating the optical path distance, in the element 130, to the light ray bundle's minimum cross-section. The minimum cross-section corresponds to the exit pupil of the eyepiece 134. Its location in the element 130 will depend on the design of the eyepiece and of the element 130 as well as other factors those skilled in the art can recognize. The focal length of the lens 156 is selected so it will reimage the eyepiece 134's exit pupil at infinity, i.e., so it will collimate the light emerging from it. This arrangement optimizes the transfer of light onto the sensor of the camera 44, but it isn't mandatory.

In the preferred embodiment of the monolithic optical element 130 the top and bottom surfaces 131 and 133 are parallel. The reflecting surface 150 makes an included angle with the bottom surface 133 of 52.5°. The intermediate reflecting surface 152 is normal to the top and bottom surfaces 131 and 133 and makes an angle of 157.5° with a surface 135 that is normal to the plane of the reflecting surface 150. The reflecting surface 154 and the top surface 133 subtend an included angle of 45° and its intersection with the top surface 131 forms a 67.5° included angle with the intersection of the top surface 131 and the intermediate reflecting surface 152.

Surface 150 is metal coated and painted black on its rear to eliminate spurious reflections of light into the camera. The reflecting surfaces 152 and 154 can be left unmetalized and internal reflection can be relied on at these surfaces. However, because of the variety of angles of incidence between the surfaces 152 and 154 and the light rays in the bundle, in some applications they may require an aluminum or other metal film to promote reflection of the light incident on them.

The size of the element 130 is selected so its reflecting surface 150 will extract the light of a chordal segment of the microscope's image without casting its shadow on the photosensitive area of a film unit in the camera, and the reflecting surface 154 and the lens 156 at the other end can direct the extracted light into the window 144 of the camera's automatic exposure control. FIG. 3c includes the sizes of the angles best suited to the preferred embodiment for use with the SX-70 Land Reflex Camera.

The holder 48, as illustrated in FIG. 1, using an SX-70 Land Reflex Camera makes it easy to adjust the element 130 so it doesn't cast its shadow within the film format's boundary. The user has merely to watch through the viewer 64 as he positions the integral optical element 130 by rotating knob 68. He can see then if its leading edge is parallel to the film format's edge and, if it casts an unwanted shadow, make appropriate adjustments. In the case of a non-reflex camera, a series of trial exposures aid in empirically positioning the integral optical element 130. Alternatively, its location can be fixed by appropriate engineering design with reference to specifications of a specific camera and microscope and holder.

A most important feature of the element 130 is its suitability for being molded inexpensively as a single piece of transparent material such as polymethyl methacrylate, polycarbonate or polystyrene.

Certain specimens, samples, or subjects 58 yield an asymmetrically illuminated image with marked differences of illumination between the unused portions of the image. With the foregoing invention, such a subject 58 can be rotated on the microscope stage 60 to present a particular chordal segment to the light pickup (the means for diverting the segment's light out of the optical path) to obtain optimum photographic results from the camera's automatic exposure control. Selection of a chordal segment for diversion can be done through the microscope or through the cameras's viewer or it can be done empirically in accord with the results of exposure tests.

It will be understood that variations and modifications of the invention are possible in light of this disclosure, and it will be apparent to those skilled in the art that various changes in form and arrangements may be made to suit specific requirements without departing from the spirit and scope of the invention. Therefore, it is to be understood that within the scope of the appended claims, the invention may be practiced in a manner than otherwise specifically described herein.

What is claimed is:

1. An optical element intended for coupling the automatic exposure control of a photographic camera having a rectangular photographic format to an image-forming optical instrument by diverting light from at least one portion of said image that will not fit within said format to said automatic exposure control, said optical element comprising:
    a first reflecting surface parallel to an edge of said format and oriented to reflect light from said optical instrument laterally with respect to said camera's optic axis;
    a second reflecting surface oriented to reflect said light into said camera's automatic exposure control;
    a dioptric surface, between said second reflecting surface and said automatic exposure control, for changing the solid angle subtended by said light so as to increase the amount of said light reaching the photosensitive detector of said automatic exposure control; and
    a homogeneous transparent medium through which said light travels from said first reflecting means to said dioptric surface via said second reflecting means.

2. The optical element of claim 1, further comprising a total internal reflective surface on said homogeneous transparent medium to reflect said light from said first reflecting means to said second reflecting means.

3. An adaptor for functionally joining a self-contained photographic camera to an image-forming optical instrument, said adaptor comprising:
    attaching means for joining said camera to said optical instrument so that the image formed by said optical instrument may be photographed by said camera, said attaching means including clamping means for releasably locking said attaching means to said optical instrument, retaining means for releasably receiving said camera, and means for providing a separation between said camera and the opening in said optical instrument through which said image emerges; and
    prismatic optical element means, located in said separation, for diverting, from the optical path between said instrument and said camera, at least a portion of the light forming a segment of said image otherwise destined to lie outside the film format boundary of said camera, and for conducting said light to a light sensor, said prismatic optical element means including optically transparent material with a refractive index greater than 1.0 bounded by a pair of smooth parallel surfaces, a first reflecting surface for reflecting said light as it enters said optically transparent material through a first of said smooth parallel surfaces along the channel defined by said smooth parallel surfaces, and
    a second reflecting surface for reflecting said light coursing through said channel through the second of said smooth surfaces.

4. The adaptor described in claim 3 wherein said prismatic optical element means further includes:
    an intermediate reflecting surface for reflecting said light so as to change its direction within said channel toward said second reflecting surface.

5. The adaptor described in claim 4 wherein said prismatic optical element means further includes:
    a positive refracting surface on the portion of said second smooth surface through which said light emerges from said optically transparent material, whereby said refracting surface changes the solid angle otherwise subtended by said light emerging from said second smooth surface.

6. The adaptor described in claim 5 wherein said positive refracting surface substantially collimates the light emerging from it.

7. The adaptor described in claim 6 wherein the focal length of said positive refracting surface approximates the optical path distance through said prismatic optical element to the exit pupil of said optical instrument.

* * * * *